(12) United States Patent
Shkolnikov et al.

(10) Patent No.: US 12,044,613 B2
(45) Date of Patent: *Jul. 23, 2024

(54) PARTICLE CLASSIFYING

(71) Applicant: Hewlett-Packard Development Company, L.P., Spring, TX (US)

(72) Inventors: Viktor Shkolnikov, Palo Alto, CA (US); Diane R. Hammerstad, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 614 days.

This patent is subject to a terminal disclaimer.

(21) Appl. No.: 17/413,706

(22) PCT Filed: Jan. 13, 2019

(86) PCT No.: PCT/US2019/013411
§ 371 (c)(1),
(2) Date: Jun. 14, 2021

(87) PCT Pub. No.: WO2020/145995
PCT Pub. Date: Jul. 16, 2020

(65) Prior Publication Data
US 2022/0018755 A1     Jan. 20, 2022

(51) Int. Cl.
*G01N 15/1434*    (2024.01)
*G01N 15/00*     (2024.01)
*G01N 15/1404*   (2024.01)

(52) U.S. Cl.
CPC . *G01N 15/1434* (2013.01); *G01N 2015/0053* (2013.01); *G01N 2015/1422* (2013.01)

(58) Field of Classification Search
CPC ....... G01N 15/1434; G01N 2015/0053; G01N 2015/1422; G01N 15/1484; G01N 15/1456; G01N 2015/1006
USPC ........................................................ 356/337
See application file for complete search history.

(56) References Cited

U.S. PATENT DOCUMENTS

| 5,581,349 | A  | 12/1996 | Halaka |
| 2002/0127144 | A1 | 9/2002 | Mehta |
| 2007/0148045 | A1 | 6/2007 | Pu et al. |
| 2009/0171590 | A1 | 7/2009 | Puskas et al. |
| 2010/0200781 | A1 | 8/2010 | Khorasani et al. |
| 2016/0356695 | A1 | 12/2016 | Gabriel |
| 2017/0059471 | A1 | 3/2017 | Wachemig et al. |
| 2018/0313753 | A1 | 11/2018 | Marshall et al. |

OTHER PUBLICATIONS

Bae E, et al., Portable bacterial identification system based on elastic light scatter patterns, PubMed, J Biol Eng. Aug. 28, 2012;6(1):12. doi: 10.1186/1754-1611-6-12, 2 pages.

Chau, et al., Self-Rotation of Cells in an Irrotational AC E-Field in an Opto-Electrokinetics Chip, PLOS ONE, Jan. 2013, vol. 8, Issue 1, e51577, 8 pages.

*Primary Examiner* — Md M Rahman
(74) *Attorney, Agent, or Firm* — Foley & Lardner LLP

(57) ABSTRACT

A particle classification system may include a volume to contain a fluid having a suspended particle, electrodes proximate the volume to apply an electric field to rotate the suspended particle, a focused light source, a scattered light sensor to sense light from the focused light source that has scattered upon impinging the rotating suspended particle and a controller to classify the particle based at least in part upon signals from the scattered light sensor.

15 Claims, 7 Drawing Sheets

PARTICLE CLASSIFYING

BACKGROUND

Particles, both biological and non-biological, are often monitored and evaluated for a variety of purposes. For example, biological particles, such as cells or cellular microorganisms, such as bacteria, are often evaluated to identify diseases or to evaluate the health of an organism. Non-biological particles may be monitored and evaluated to identify pollution or environmental hazards.

Figure 1:
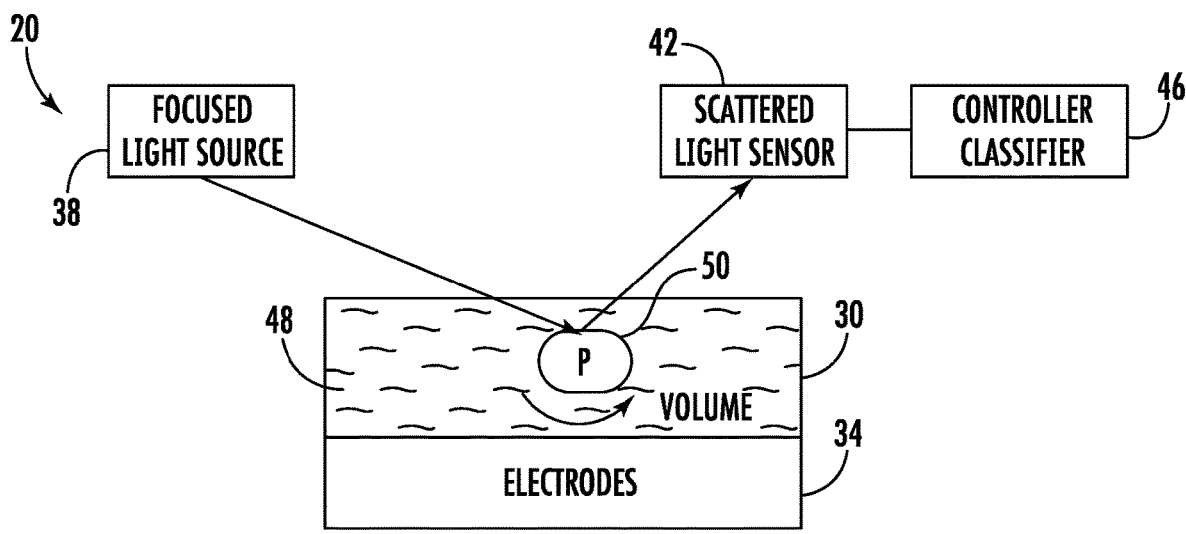
FIG. 1 is a side view schematically illustrating portions of an example particle classifying system.

Throughout the drawings, identical reference numbers designate similar, but not necessarily identical, elements. The FIGS. are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed are example particle classification systems, particle classifying methods and particle classifying computer-readable mediums that facilitate inexpensive and lab-on-a-chip classification or discrimination of particles. The disclosed particle classification systems, particle classifying methods and particle classifying computer-readable mediums are well-suited for classifying and discriminating relatively small particles, such as bacteria, which may be otherwise difficult to classify.

Extremely small particles, such as bacteria, may have a diameter of 10 μm or less. Many bacteria have a diameter of less than 5 μm or even less than 2 μm. The small size of most bacteria presents many challenges to existing bacteria classification schemes.

The classification of bacteria is often utilized for diagnosing and treating various diseases such as bacteremia and sepsis. In bacteremia, a patient's blood may be infected with one or more species of bacteria, some of which may be resistant to certain classes of antibiotics. To treat such a patient, the bacteria in the blood must be destroyed or disabled. Although the disablement or destruction of the bacteria may be achieved using a broad spectrum of antibiotics, the use of such a broad spectrum of antibiotics may increase the likelihood of bacteria evolving and becoming resistant. Although specifically identifying or classifying the bacteria within the blood may facilitate use of a targeted antibiotic, such specific identification, using existing classification schemes, is often time-consuming, possibly diminishing the patient's chance for survival.

The disclosed example particle classification systems, particle classifying methods and particle classifying computer-readable mediums facilitate inexpensive and timely identification or classification of bacteria to allow the use of targeted antibiotics and reduce the likelihood of bacteria developing resistances. The disclosed particle classification systems, particle classifying methods and particle classifying computer-readable mediums facilitate more timely identification of bacteria such that a patient may be treated in a timelier manner, so as to increase the patient's chance for survival.

The disclosed example particle classification systems, particle classifying methods and particle classifying computer-readable mediums identify or classify particles by rotating the individual particles using an electric field and sensing light that has scattered from the rotating particles. In one implementation, the sensed light is used to determine a rate of rotation of the particles, wherein the rate of rotation in response to a given electrical field may serve as a signature for a particular type of particle, such as a particular type of bacterium. In one implementation, the intensity of the sensed light in combination with the rate of rotation determined from the sensed scattered light may serve as a signature to identify a particular type of particle or particular type of bacterium.

In some implementations, different electrical fields having different electrical frequencies may be applied to the particle, wherein the different electrical frequencies may cause the particle to rotate at different rotational rates or speeds. The response of the particle to the different electrical fields having different electric frequencies may itself serve as a signature for identifying the type of particle or type of bacterium. For example, a first particle may experience a first change in rotational speed in response to two different electrical frequencies of the electrical field while a second different particle may experience a second different change in rotational speed in response to the same two different electrical frequencies of the electrical field. In some implementations, a particle being identified may be exposed to a wide range of different frequencies, wherein changes in the rotational speed of the particle across the range of different frequencies is sensed (using the sensed scattered light) and wherein different changes may serve as signatures for identifying the particular particle or the particular bacterium.

In each of such implementations, the values obtained during rotation of the particle induced by the electrical field may be stored and compared to a library of previously identified particles or bacterium. For example, a known bacterium may be subjected to an electric field and a focused light source, wherein scattering of the light from the rotating bacterium may be sensed and such sensed values or derivations from such sensed values may be stored as part of a library or database (i.e., a lookup table). The values derived from the sensed scattering of light from an unknown bacterium in the same electric field may be compared to the established library or database to identify the unknown bacterium.

In some implementations, the particle is rotated with a non-rotating electric field. A nonrotating electric field may be generated by a pair of electrodes or a pair of electrode lines. Use of a non-rotating electric field facilitates use of a pair of electrode lines which facilitates the concurrent rotation of multiple particles or bacterium along a single pair of electrode lines. By locating multiple scattered light sensors along the single pair of electrode lines, light being concurrently scattered from a plurality of particles or a plurality of bacteria along pair of electrode lines may be concurrently sensed. As a result, a plurality of particles or a plurality of bacterium may be concurrently discriminated, classified or identified.

Rotating multiple particles with a non-rotating electric field facilitates faster classification of a larger number of particles or a larger number of bacteria. Such faster classification of particles or bacterium may provide the opportunity to ascertain additional data regarding a biological sample that may not have been previously achievable due to the time otherwise consumed to identify a sufficient number of bacteria. For example, by more quickly ascertaining the identification of classification of a larger number of bacteria in a biological sample, more accurate bacteria population values are obtainable. More accurate estimates regarding live versus dead bacteria may be obtained. More accurate determinations regarding the efficacy of an antibody or reagent in disabling or destroying a particular bacterium may be achieved by more accurately determining changes in a death rate of a particular bacterium in response to the introduction of an anti-body or other reagent.

The disclosed example particle classification systems, particle classifying methods and particle classifying computer-readable mediums further facilitate more portable and compact systems and devices for classifying particles or bacteria. In some implementations, electrodes form electric fields that are controlled so as to move the particles or bacteria, using dielectrophoresis, to a smaller sensing region having the particle rotating electrodes and the scattered light sensor or sensors. In some implementations, a controller is provided to control the supply of AC voltage sources to the electrodes so as to produce a traveling wave dielectrophoresis force from multiple directions to move the particle to a target sensing location. In some implementations, the controller may be provided to control the supply of AC voltage the electrodes such that the timing of the electrical field is synchronized with a dispenser of the particles. In some implementations, a controller may control the supply of AC voltage source to the electrodes such that (1) a first electrical field pulls a particle towards the electrodes, (2) after pulldown, a second electrical field moves a particle to a sensing region and (3) a third electrical field rotates of particles at the sensing position or rotation of the particle sense for classification of the particle.

In some implementations, multiple electrode pairs, a series of parallel electrode lines or a series of concentric electrode rings, may draw, hold and spin multiple particles through the application of an alternating current electrical field. In such implementations, a stage or platform supporting the electrodes and/or a framework or structure supporting scattered light sensors may be selectively positioned relative to one another by an actuator so as to facilitate the sequential sensing of scattered light from different particles along the different electrodes and the classification or identification the different particles. The positioning may be controlled through closed loop feedback to enhance the strength or reliability of the scattered light measurements for the different particles along the different electrodes or along a single electrode.

In some implementations, the classification or identification of a particle or particles is carried out based upon the sensed light scattered from the spinning or rotating particle without imaging of the particle. For example, in one implementation, the classification or identification is performed based upon spinning or rotational characteristics of the particle without imaging of the particle. In other implementations, the classification identification of the particle or particles may be additionally based upon imaging or images of the particle or particles.

Disclosed is an example particle classification system that may include a volume to contain a fluid having a suspended particle, electrodes proximate the volume to apply an electric field to rotate the suspended particle, a focused light source, a scattered light sensor to sense light from the focused light source that has scattered upon impinging the rotating suspended particle and a controller to classify the particle based at least in part upon signals from the scattered light sensor.

Disclosed is an example particle classifying method that comprises applying an electric field to induce rotation of a particle suspended within a fluid, sensing scattered light that has scattered upon impinging the particle during the rotation and classifying the particle based upon the scattered light.

Disclosed is an example non-transitory computer-readable medium for classifying a particle. The medium may comprise instructions to direct a processor to output control signals to an alternating current power source to apply an electric field to a particle suspended in a fluid, to receiving signals from a scattered light detector indicating rotation of the particle in response to the applied non-rotating electric field and to classify the particle based upon the indicated rotation of the particle.

FIG. 1 is a schematic diagram illustrating portions of an example particle classification system 20. Particle classification system 20 facilitates inexpensive particle classification and lab-on-a-chip classification or discrimination of particles. Particle classification system 20 is well-suited for classifying and discriminating relatively small particles, such as bacteria, which may be otherwise difficult to classify. Particle classification system 20 comprises fluid volume 30, electrodes 34, focused light source 38, scattered light sensor 42 and controller classifier 46.

Fluid volume 30 is to contain a fluid 48 in which a particle to be monitored or to be suspended. Volume 30 may be in the form of a channel through which the fluid with the suspended particle or particles flow or may be in the form of a reservoir or well. In one implementation, the fluid 48 received by volume 38 may be in the form of a sample, such as a blood sample, taken from a patient. In some implementations, fluid 48 may be pre-filtered to remove larger particles or other particles not of interest.

In some implementations, the particle 50 of interest may be a bacterium having a diameter of no greater than 10 μm. In some implementations, the particle 50 of interest may be a bacterium having a diameter of no greater than 5 μm. In some implementations, the particle 50 of interest may be a bacterium having a diameter of less than 2 μm. As noted above, system 20 facilitates the identification classification of such small particles, such as such small bacterium.

Electrodes 34 comprise electrically conductive structures which are placed at different electrical charges so as to form an electrical field within volume 30. Electrodes 34 may be directly adjacent to volume 30 or may be spaced from volume 30, but in sufficient proximity to form an electric field within volume 30. The electric field to be formed by electrodes 36 is to manipulate the particle or particles suspended within the fluid contained within volume 30. The electric field is controlled so as to spin or rotate the individual suspended particle about its own axis, using dielectrophoresis. Such spinning occurs without the surrounding volume 30 or electrodes 34 physically rotating.

In one implementation, electrodes 34 (schematically illustrated) may be in the form of a set of electrodes spaced around the particle 50 suspended in fluid 48, wherein the set of electrodes, when electrically charged, apply a rotating electric field. The rotating electric field induces rotation of particle 50. In another implementation, electrodes 34 may comprise pairs of electrodes, which upon being electrically charged, apply a non-rotating electric field. The non-rotating electric field induces rotation of the particle 50. The inducement of rotation of particle 50 using a non-rotating electric field facilitates the use of electrically conductive lines that may concurrently rotate multiple individual particles 50 for concurrent classification identification of multiple particles 50 along the single pair of electrodes 34.

Focused light source 38 comprises a source of focused light directed at volume 30 so as to be directed at the particle 50 suspended within fluid 48 as it is being rotated by electrodes 34. In implementations where the electrodes 34 comprise a pair of electrodes that apply a non-rotating electric field to induce rotation particle 50, focused light source 38 focuses light at an edge of at least one of the electrodes. In one implementation, focused light source 38 directs visible light at particle 50. In other implementations, light source 38 may direct other wavelengths of electromagnetic radiation.

Scattered light sensor 42 comprises at least one optical detector that senses scattered light, light from light source 38 that has impinged particle 50 and that has scattered off of particle 50. Such scattered light may vary as a function of the spin or rotation of particle 50. As a result, signals from scattered light sensor 42 may correspond or otherwise indicate rotational characteristics of particle 50. In one implementation, scattered light sensor 42 may comprise scattered light receptors in the form of lenses having a field of view sized and located such to contain an individual particle 50 (based upon anticipated size of the particle of interest) which direct the received scattered light to a photosensitive structure. In one implementation, the scattered light receptor or receptors are each located and oriented so as to have a field of view directed at an edge of one of electrodes 34, the expected location of the particle of interest 50 when it is rotating. In one implementation, the photosensitive member may comprise a charge coupled device, such as a CCD formed from pixels such as p-doped metal-oxide-semiconductors capacitors. Such capacitors convert incoming photons in electron charges at the semi-conductor-oxide interface, wherein such charges are read to detect light impingement at the individual pixels. In other implementations, the photosensitive structure or layer of scattered light sensor 42 may comprise other layers or devices that are sensitive to the impingement of photons or light. For example, in other implementations, the photosensitive structure or layer may comprise a photomultiplier array detector, an avalanche photodiode array detector, or other optical detectors. In one implementation, scattered light sensor 42 does not capture an image of the particle being sensed. In other implementations, the scattered light sensor 42 has a resolution so as to additionally capture an image of the particle being sensed.

Controller classifier comprises a processor that follows instructions contained in a non-transitory computer-readable medium to control the operation system 20 and to generate classification results for the particle 50 of interest. In other implementations, the functions of controlling system 20 and the function of classifying particle 50 based upon signals from sensor 42 may be distinct and separate, carried out by distinct processing units and associated non-transitory computer-readable medium instructions. For example, a separate controller may control electrodes 34, focused light source 38 and sensor 42 and a separate classifier may generate and output identification or classification data for particle 50 based upon signals from sensor 42.

In one implementation, controller classifier 46 determines a spin rate or rotation rate for particle 50 based upon the signals from scattered light sensor 42. Controller classifier 46 compares the determined spin rate for a given electrical field or frequency applied to particle 50 to values in a library, such as a lookup table, containing the rotation rate or spin rate for already identified particles being spun by an electric field at the same given frequency. Based upon such comparison, controller classifier 46 may identify or classify the unknown particle of interest being spun. For example, if particle 50 exhibits a spin rate that is sufficiently close to a previously identified spin rate for a previously identified particle of a particular type, particle 50 may be identified as being of the same type or classification as the previously identified particle.

In one implementation, controller classifier 46 may sweep the electrodes 34 across a range of frequencies, a plurality of different alternating current (AC) frequencies, wherein controller classifier 46 further determines the spin rate or rotation rate of particle 50 at each of the AC frequencies. The degree to which particle 50 changes its spin rate in response to a change in frequency (its spin rate to frequency profile) may be compared to corresponding values in a library or database for previous identified particles to identify or classify the particular currently unknown and targeted particle 50. For example, if particle 50 exhibits a spin rate change in response to a frequency being incremented by certain extent and a previously identified particle 50 exhibits a similar spin rate change in response to the same incrementing of the frequency, the particle 50 may be identified by controller classifier 46 as being of the same type of particle as the previously identified particle.

In some implementations, the different spin rates or rotation rates of the particle 50 at multiple different frequencies form a spin rate profile, such as a graph illustrating different spin rates at the different frequencies. This spin rate profile may itself serve as a signature for comparison to a library of spin rate profiles of previously identified particles. Controller classifier 46 may classify the unknown particle as a particular particle type in response to the unknown particle having a spin rate profile similar to the spin rate profile of a previously identified particle.

In some implementations, controller classifier 46 may utilize multiple factors or determinations as part of identifying or classifying the particular particle. Controller classifier 46 may compare several sensed values or derivatives of the sensed values from sensor 42 received during the rotation of particle 50 by electrodes 34 with corresponding sensed values or derivatives received during the rotation of previously identified particles (as stored in the library). For example, controller classifier 46 may identify or classify the particular particle 50 based upon at least two of the following factors: the determined spin rate of particle 50 in response to a particular frequency, the profile of the spin rate of particle 50 across a particular range of frequencies, the determined spin rate in response to a particular frequency and the addition of a particular reagent, the profile of the spin rate of particle 50 across a particular range of frequencies with a particular reagent addition, the determined spin rate of particle 50 in response to a particular frequency at a particular temperature, the profile of the spin rate of particle 50 across a particular range of frequencies, at a particular temperature, the intensity of the light scattered from particle 50 and sensed by sensor 42 at a particular frequency and the intensity profile of the light scatter from particle 50 across a range of frequencies.

Because classifier 46 identifies or classifies particle 50 based upon rotation rate or spin rate determined from signals from scattered light sensor 42, classifier 46 may more reliably identify or classify a particle 50 of sizes no greater than 10 µm in diameter, sizes no greater than 5 µm in diameter and even sizes no greater than 2 µm in diameter. As a result, classifier 46 is well-suited for identifying classifying bacterium which may often have a diameter of no greater than 10 micrometers in diameter, no greater than 5 µm in diameter and even no greater than 2 micrometers in diameter. Using the determined identifications or classifications of multiple particle 50 of a sample, controller classifier 46 may further determine population percentages, living versus dead bacterium statistics, and mortality rates for bacterium in response to the addition of particular agents or reagents, such as different antibiotics and the like.

Figure 2:
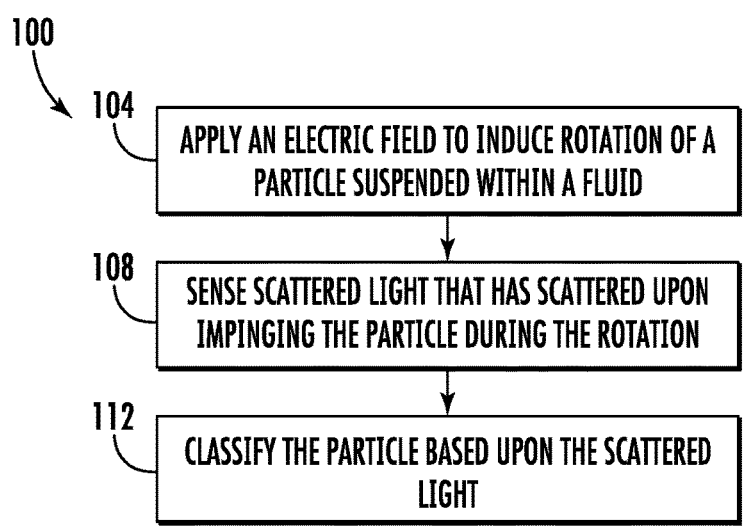
FIG. 2 is a flow diagram of portions of an example particle classifying method.

FIG. 2 is a flow diagram of an example particle classifying or classification method 100. Method 100 facilitates inexpensive classification or discrimination of particles. Method 100 is well-suited for classifying and discriminating relatively small particles, such as bacteria, which may be otherwise difficult to classify. Although method 100 is described in the conscience of being carried out by system 20, it should be appreciated that method 100 may likewise be carried out with any of the particle classification system described hereafter or with similar particle classification systems.

As indicated by block 104, controller classifier 46 outputs control signals to an AC voltage source connected to electrodes 34, resulting in electrodes 34 applying an electric field to induce rotation of a particle, such as particle 50, suspended within a fluid, such as fluid 48. In one implementation, electrodes 34 are situated about the particle being rotated and apply a rotating electric field, wherein the electrodes are sequentially driven. In another implementation, electrodes 34 comprise a pair of electrodes which are driven so as to apply a non-rotating electric field, wherein particle 50 is rotated as a result of dielectrophoresis.

As indicated by block 108, scattered light sensor 42 senses scattered light, light that has scattered upon impinging the particle 50 during its rotation. Scattered light sensor 40 is to output signals to controller classifier 46 based upon the sensed scattered light.

As indicated by block 112, controller classifier 46 uses the signals from scattered light sensor 42 to classify a particular particle of interest having an unknown identity. In one implementation, controller classifier 46 determines a spin rate or rotation rate for the particle 50 at the particular AC frequency applied to electrodes 34 and then compares the determined spin rate or rotation rate to a library of previously determined spin rates or rotation rates for particles having an already determined identity, wherein the spin rates for the already identified particles in the library were determined at substantially the same applied AC frequency and the same electrode arrangement as that applied to the unknown particle 50. In response to the unknown particle having a spin rate within a predefined range of the spin rate of a particular type of particle found in the empirically determined library, the unknown particle 50 may be classified identified as being the same particular type as the particular type of particle having spin data found in the library.

Figure 3:
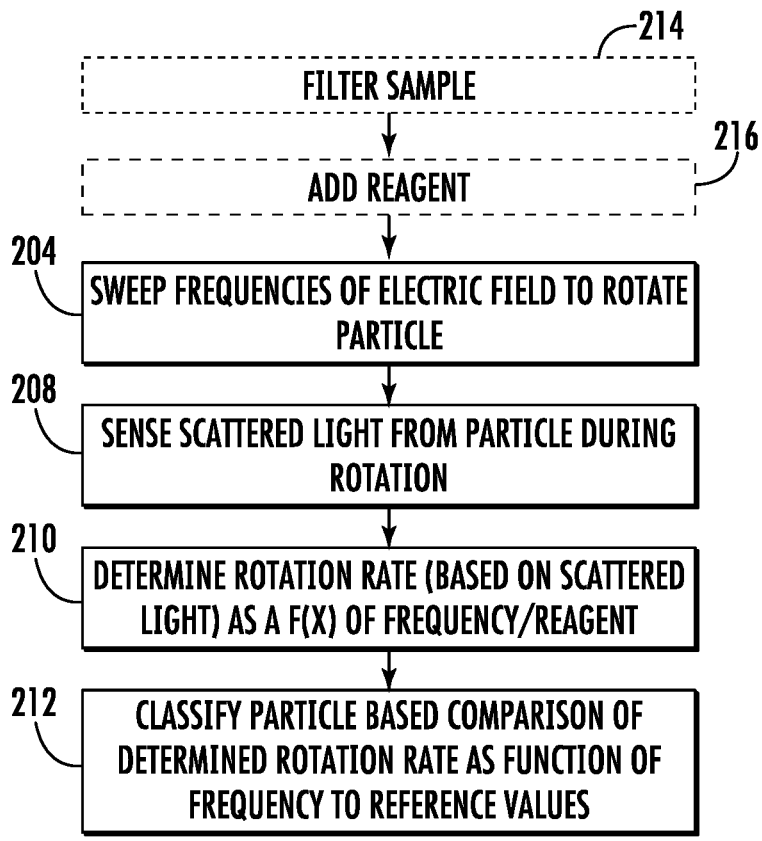
FIG. 3 is a flow diagram of portions of an example particle classifying method.

FIG. 3 is a flow diagram illustrating portions of an example particle classifying method 200. Method 200 facilitates inexpensive classification or discrimination of particles. Method 200 is well-suited for classifying and discriminating relatively small particles, such as bacteria, which may be otherwise difficult to classify. Although method 200 is described in the conscience of being carried out by system 20, it should be appreciated that method 200 may likewise be carried out with any of the particle classification system described hereafter or with similar particle classification systems.

As indicated by block 204, controller classifier 46 outputs control signals to an AC voltage source connected to electrodes 34 causing electrodes 34 to sweep across multiple frequencies, to provide a sweep of frequencies of electric field to rotate a particle, such as particle 50, suspended within a fluid, such as fluid 48. In one implementation, controller classifier 46 outputs control signals causing an AC voltage source to apply a voltage of at least 3 volts and no greater than 30 volts to the electrodes 34. The sweeping of frequencies may occur in a continuous manner or in a stepwise manner. In one implementation, the sweep of frequencies occurs across a range of 20 KHz to 10 MHz. The sweeping of frequencies of alternating current applied to electrodes 34 may cause the suspended partner to rotate at different spin rates or rotation rates. The different spin rates result in the rotating particle 50 differently scattering light from focused light source 38.

As indicated by block 208, the light scattering from the particle during its rotation is sensed. In one implementation, the light is sensed with a scattered light sensor having optics that focus photons onto a photosensitive layer. The photosensitive layer may comprise a charge coupled device, a photomultiplier array detector, an avalanche photodiode array detector, or other optical detectors.

As indicated by block 210, the rotation rate as a function of frequency of the AC current applied to the electrodes to form an electric field to rotate the particle is determined. The resulting spin rate to frequency profile may be stored in a memory. As indicated by block 212, the particle may be classified based upon a comparison of the determined rotation rate as a function of frequency (the spin to frequency profile) to corresponding reference values in a database or library, such as a lookup table. For example, lookup table may contain various spin to frequency profiles for various previously identified particles, such as previously identified bacterium. The particle or bacterium may be identified as being of the same type as a previously identified particle or bacteria in circumstances where the profiles are sufficiently similar. In one implementation, the classifier may output a degree of confidence value regarding the identification of the unknown particle based upon the degree of similarity between the different spin to frequency profiles, wherein a higher degree of similarity may result in the output of a higher confidence value.

As indicated by block 214 in broken lines, in some implementations, the sample of the fluid containing the particle of interest may be prefiltered. Such pre-filtering may remove particles that are not of interest. For example, in one implementation, where the analysis to determine whether the sample contains a particle having a diameter of less than 5 μm, the solution may be prefiltered to remove those particles having a diameter of at least 5 mm.

As indicated by block 216 in broken lines, in some implementations, a reagent may be applied to the fluid containing the unknown particle to further facilitate identification of the unknown particle. The reagent may be a reagent that differently interacts with different types of particles, wherein the different reactions with the reagent may further facilitate distinguishing the particle of interest from other particles. For example, in one implementation, the reagent may be a particular type of antibiotic. In some implementations, the reagent may be an antibiotic and the output provided in block 212 further indicates the efficacy of the antibiotic with respect to a bacterium. In other implementations, reagent may comprise other additives such as cell stains, such as hexamethyl pararosaniline chloride (gramm stain), which may alter the particle's or cell's scattering or spinning behavior.

Figure 4:
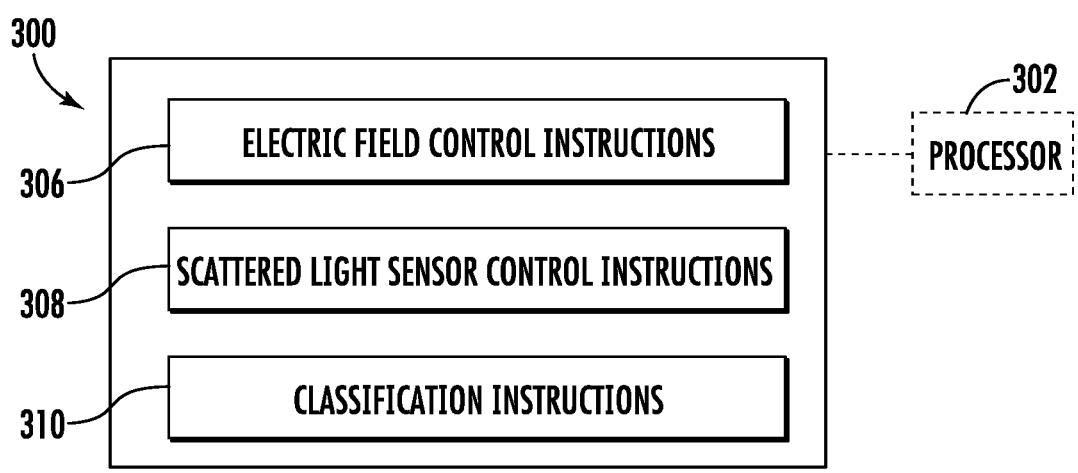
FIG. 4 is a block diagram schematically illustrating portions of an example non-transitory computer-readable medium containing particle classifying instructions.

FIG. 4 is a block diagram schematically illustrating portions of an example non-transitory computer-readable particle classifying medium 300 of controller classifier 46. Medium 300 comprises instructions for directing a processor 302 (shown in broken lines) for carrying out the classification of a particle. In one implementation, the instructions (also referred to as code or programming) contained in medium 300 may be used to carry out method 100. In yet another implementation, the instructions contained in medium 300 may be used to carry out method 200. Medium 300 comprises electric field control instructions 306, scattered light sensor control instructions 308 and classification instructions 310.

Electric field control instructions 306 comprise instructions to direct a processor 302 to output control signals controlling an AC source connected to electrodes 34. Instructions 306 cause the electrodes to be electrically charged so as to create an electric field that rotates a particle of interest suspended within a fluid. As described above, in one implementation, instructions 306 result in electrodes applying a rotating electrical field. In another implementation, instructions 306 result in electrodes applying a non-rotating electric field. In one implementation, the instructions result in electrodes being electrically charged at a single predetermined or selected frequency of alternating current so as to rotate part particle, such as particle 50. In another implementation, instructions 306 result in electrodes being electrically charged across a range of frequencies (in a continuous or in a stepwise manner), wherein rotation of the particle is induced at each of the frequencies.

Scattered light sensor control instructions 308 comprise instructions that direct a processor 302 to control a scattered light sensor, such as scattered light sensor 42, or to control the reception of signals from a scattered light sensor. Such instructions may carry out further operations on the received signals output by a scattered light sensor to remove unwanted noise.

Classification instructions 310 comprise instructions to direct a processor 302 to identify or classify a particular particle (or multiple particles) based upon signals from the scattered light sensor. In one implementation, such instructions 310 direct a processor 302 to carry out block 112 as described above. In another implementation, instructions 310 direct a processor 302 to carry out block 212 as described above.

Figure 5:
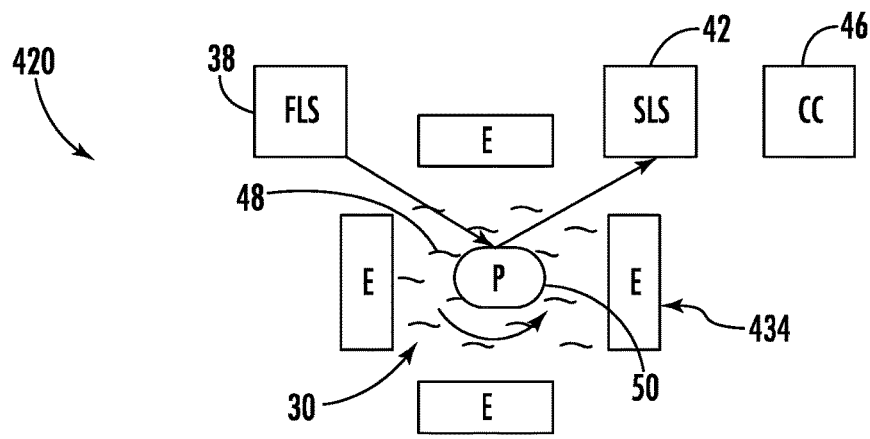
FIG. 5 is a diagram schematically illustrating portions of an example particle classifying system.

FIG. 5 is a diagram schematically illustrating portions of an example particle classification system 420. Classification system 420 is similar to classification system 20 described above except that classifications is 420 specifically comprises electrodes 434. Those remaining components of system 420 which correspond to components of system 20 are numbered similarly.

Electrodes 434 comprise a series of electrodes positioned about a portion of volume 30 containing the particle 50 of interest. Electrodes 434 apply a rotating electric field through the synchronous serial charging of such electrodes 434. In the example illustrated, electrodes 434 comprise electrodes annually positioned about the particle 50 being rotated by 90°. In other implementations, a greater or fewer of such electrodes 434 may be utilized to form the rotating electric field for rotating the particle as light is from focused light source (FLL) 38 is being scattered by the rotating particle 50 and as scattered light is being sensed by scattered light sensor (SLS) 42. Control classifier (CC) 46 utilizes such signals to identify or classify the particular particle 50 of interest as described above. In one implementation, system 420 may be utilized to carry out method 100. In another implementation, system 420 may be utilized to carry out method 200.

Figure 6A:
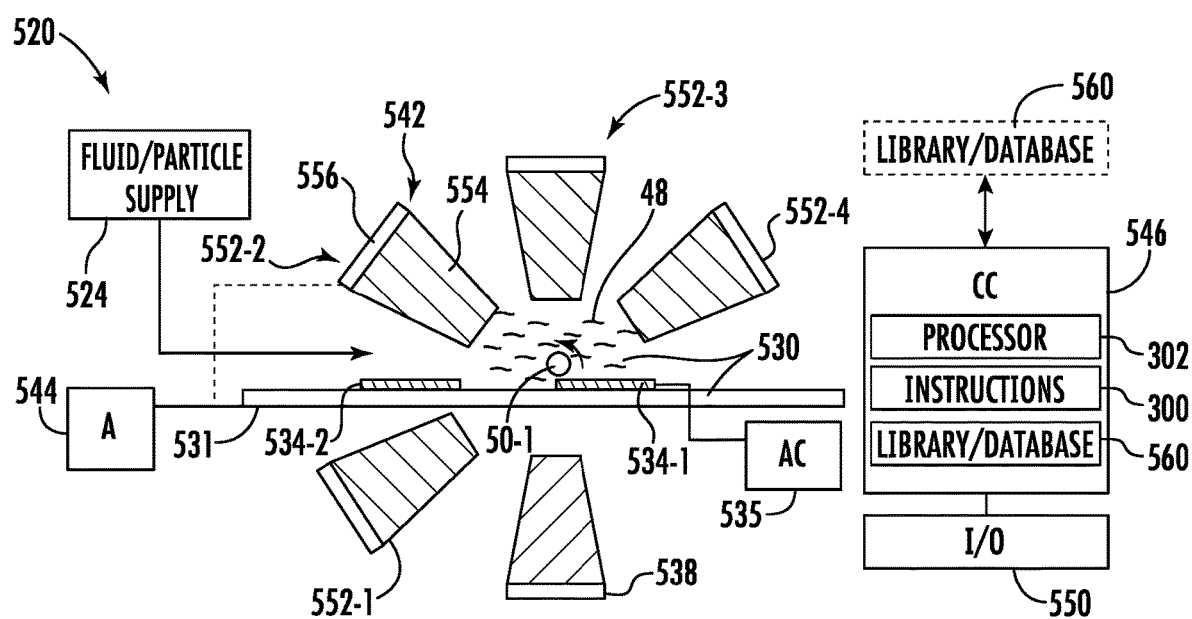
FIG. 6A is a side view illustrating portions of an example particle classifying system.
Figure 6B:
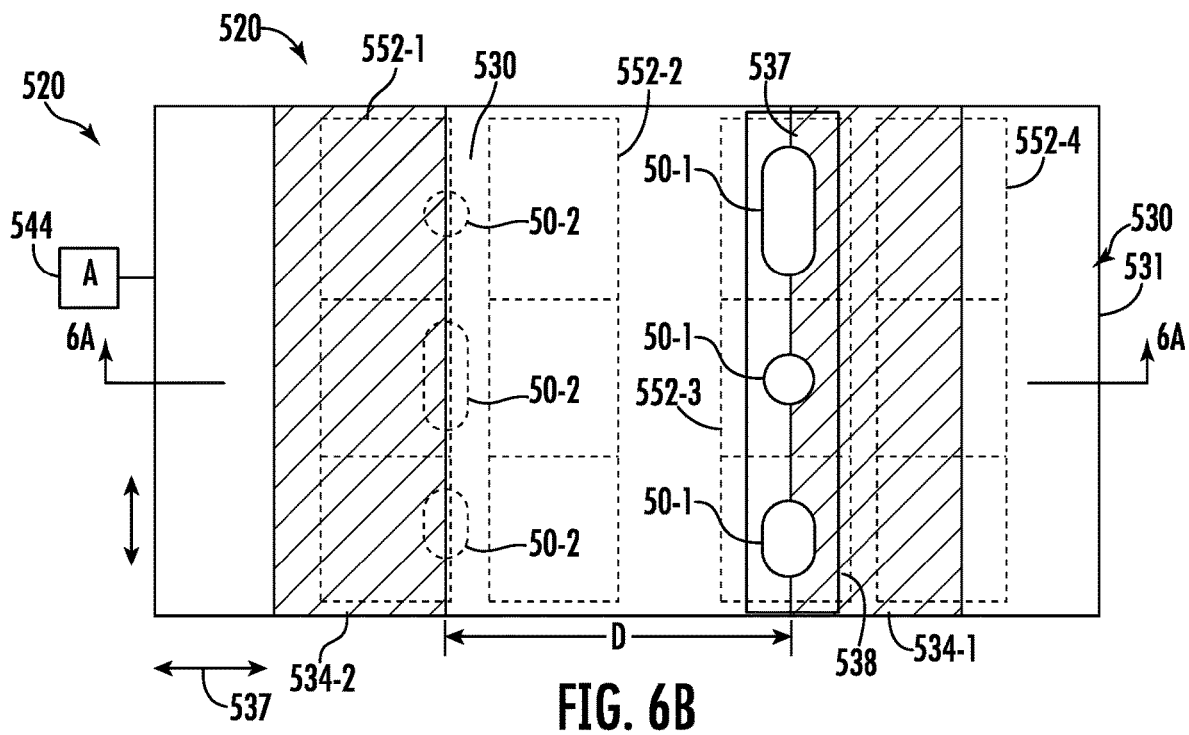
FIG. 6B is a top view illustrating portions of the example particle classifying system of FIG. 6A.

FIGS. 6A and 6B illustrate portions of an example particle classification system 520. FIG. 6A is a side view of system 520. FIG. 6B is a top view of system 520. As with systems 20 and 420 described above, system 520 facilitates inexpensive and lab-on-a-chip classification or discrimination of particles. System 520 is well-suited for classifying and discriminating relatively small particles, such as bacteria, which may be otherwise difficult to classify. In addition, system 520 facilitates the classification of particles or the measurement of particle properties for a large number of particles simultaneously. System 520 comprises fluid/particle supply 524, volume 30 (described above), electrodes 534-1, 534-2 (collectively referred to as electrodes 534), focused light source 538, scattered light sensor 542, actuator 544, controller classifier 546 and input/output 550.

Fluid/particle supply 524 comprises a supply of fluid containing or potentially containing particles of interest, such as particle 50. Such particles may be biological or non-biological particles. In one implementation, such particles may be part of a biological sample, such as a blood sample, or the particles may comprise particles of interest such as bacteria. In one implementation, supply 524 contains a pre-filtered fluid, fluid from which selected particles have been removed through the application of a physical filter. In some implementations, supply 524 contains and supplies a fluid to which a reagent has been added, such as chemical tags, stains, antibiotics or the like. Supply 524 supplies the fluid to volume 530.

Volume 530 comprises a fluid reservoir, channel or passage extending along electrodes 534. Volume 530 contains a fluid as the particles within the fluid are being rotated by the application electric field by electrodes 534. In the example illustrated, volume 530 comprises a transparent floor 531 upon which electrodes 534 are formed. In one implementation, transparent floor 531 and, in some implementations, other portions of volume 534, such as sidewalls or a ceiling of volume 530 may be formed from a transparent material such as glass or a transparent polymer.

Electrodes 534 comprise a pair of electrode lines formed on floor 531 and connected to an AC voltage power source 535. Electrodes 534 are to be electrically charged so as to form a non-rotating electric field between electrodes 534 and about those particles 50 along electrodes 534. In one implementation, electrodes 534 are spaced by a distance D of at least 50 um and no greater than 500 um. In one implementation, electrodes 534 are formed from a transparent electrically conductive material, facilitating the transmission of light through such electrodes 534 and the sensing of scattered light through electrodes 534. In one implementation, electrodes 534 form from a transparent electrically conductive material such as indium tin oxide. In other implementations, electrodes 534 may be formed from other transparent electrically conductive materials. In particular implementations where light is not transmitted through such electrodes or is sensed through such electrodes, electrodes 534 may be formed from non-transparent electrically conductive materials.

Focused light source 538 is similar to focused light source 38 described above. Focused light source 538 comprises a source of focused light directed at volume 530 so as to be directed at the particles 50 suspended within fluid 48 as they are being rotated by electrodes 534. In the example illustrated, source 538 focuses light at an edge of at least one of the electrodes. In one implementation, focused light source 538 directs visible light at particles 50. In other implementations, light source 538 may direct other wavelengths of electromagnetic radiation.

Scattered light sensor 542 comprises an array of sensors 552-1, 552-2, 552-3 and 552-4 (collectively referred to as sensors 552) angularly positioned about an edge of one of electrodes 534 along which particles 50 are drawn and are rotated in response to the electrical field applied by electrodes 534. The multiple scattered light sensors 542 provide the sensing of different scattered light from the same rotating particle, at different angles, to provide increased amount of data, a more detailed "signature" to potentially better and more accurately identify and classify the particle. Although system 520 is illustrated as comprising four angularly spaced sensors 552, in other implementations, system 520 may comprise a greater or fewer of such sensors 552 positioned about and generally focused on an edge of electrodes 534.

Each of light sensors 552 comprises optics 554 and a photosensitive member 556. Optics 554 comprise photo receptive members such as light transmitting lenses or other optical members that are located and oriented to has to have a field of vision generally centered about an edge 537 of one of electrodes 534. Optics 556 receive light originating from source 538 that is scattered upon impingement with a corresponding rotating particle 50. Optics 556 direct the photons of scattered light to photosensitive member 556.

Photosensitive member 556 of each of sensors 552 outputs electrical signals in response to the photons of light being received from optics 554. Such electrical signals are transmitted to controller classifier 546 for identification and classification of the particular particle 50. In one implementation, each photosensitive member 556 may comprise a charge coupled device (CCD) formed from pixels such as p-doped metal-oxide-semiconductors capacitors. Such capacitors convert incoming photons in electron charges at the semi-conductor-oxide interface, wherein such charges are read to detect light impingement at the individual pixels. In other implementations, the photosensitive member 556 may comprise other layers or devices that are sensitive to the impingement of photons or light. For example, in other implementations, the photosensitive member 556 may comprise a photomultiplier array detector, an avalanche photodiode array detector, or other optical detectors.

As shown by dashed broken lines in FIG. 6B, in one implementation, each of sensors 552 may comprise an elongated optical member 554 and an elongated photosensitive member 556 that extend along a sufficient length of electrodes 534 to sense light that has been concurrently scattered by multiple different particles 50 located along an edge of one of the electrodes 534. Signals corresponding to the different particles 50 may be discerned from one another based upon the particular individual pixels or elements of the individual photosensitive member 556 that are stimulated by the impinging photons. In other implementations, as indicated by the dot-dash broken lines, each of sensors 542 may comprise multiple distinct and different optical members 554 and photosensitive members 556 arranged in series along an edge of electrodes 534.

Actuator 544 comprises a mechanism that physically moves electrodes 534 in at least one dimension to reposition such electrodes relative to sensors 552. In one implementation, at least floor 531 of volume 530 may be formed as a movable stage, wherein actuator 544 moves the stage to reposition electrodes 534 (and their edges to which particles are drawn and at which the particles are spun) relative to the stationary sensors 552. As shown by FIG. 6B, the electric field formed by electrodes 534 may draw and attract particles to both mutually facing edges of electrodes 534. In such an implementation, actuator 544 may move the stage (provided by floor 531) supporting electrodes 534 to reposition the edges of such electrodes (and the held particles 50) for sensing by sensors 552. For example, FIGS. 6A and 6B illustrate particles 50-1, held in spun by electrode 534-1, being generally located or aligned at the focal point of sensors 552. To sense particles 50-2 (located, held and spinning along the edge of electrode 534-2), controller classifier 546 may help control signals causing actuator 544 to linearly move floor 531 in the direction indicated by arrow 537 to locate the internal edge of electrode 534-2 (and particles 50-2) at the same position as the internal edge of electrode 534-1 as presently shown in FIGS. 6A and 6B. In one implementation, the scattered light signals used to classify or identify the particle are those taken or measured while electrodes 534 are stationary.

In one implementation, volume 530 may be stationary, but where the electrodes 534 are supported by a transparent floor or stage that is movable within volume 530. In one implementation, the floor, stage or volume 530 may be supported on guide rails and moved by an actuator such as an electric solenoid, a motor driven cam and cam follower arrangement or other mechanisms for moving one structure relative to another. In one implementation, actuator 544 may move volume 530 or the stage or floor movably supported within volume 530 in a single dimension (to the left or to the right as shown in FIG. 6B) to facilitate classification or identification of the particles 50-1 being held and rotated along the edges of electrode 534-1 and then facilitate classification identification of particles 50-2 being held along the edge of electrode 534-2.

In one implementation, actuator 544 may move volume 530 or the stage or floor movably supported within volume 530 in two dimensions. For example, actuator 544 may additionally or alternatively move volume 530 or the stage or floor movable within volume 530 in the directions indicated by arrows 539 in FIG. 6B. In such an implementation, the length of each of sensors 552 extending along electrodes 534 may be reduced, wherein actuator 544 sequentially repositions different portions of a single electrode 534 in sensing alignment with the shorter sensors 552 to facilitate sensing of the multiple particles along the individual electrode 534. For example, in one implementation, controller classifier 546 may output control signals causing actuator 544 to sequentially move volume 530 or the movable stage or floor within volume 530 in an upward or downward direction as indicated by arrow 539 to sequentially position each of the three particles 50-1 in a sensing position relative to sensors 552.

In some implementations, controller classifier 546 may output control signals causing actuator 544 to move volume 530 or the stage or floor movable within volume 530 and supporting electrodes 534 between predefined positions. In other implementations, controller classifier 546 may employ closed loop feedback based upon signals from sensors 552 to control actuator 554 and the positioning of electrodes 534 relative to sensors 552. For example, controller classifier 546 may cause actuator 554 to gradually reposition electrodes 534 relative to sensors 552 in multiple directions, comparing the strength of the scattered light signals or scattered light response from sensors 552 at each of the positions. Such a repositioning may continue until controller 546 has received a maximum sensed scattered light response from sensors 552. Once electrodes 534 have been located at a position at which the scattered light signal response is the largest, the sensed scattered light at such position may be utilized for particle identification or classification. In other implementations, multiple scattered light measurements may be taken by sensors 552 at multiple relative positions of electrodes 534 to sensors 552, wherein an average or other statistical value based on the aggregate of such measurements may be used to determine spin velocity or other parameters that will serve as a signature for identifying an unknown particle.

In yet other implementations, as shown by broken lines in FIG. 6A, actuator 544 may additionally or alternatively be operably coupled or connected to sensors 552 to move sensors 552 relative to electrodes 534 for sensing the rotation of particles spaced along a single electrode and/or for sensing the rotation of particles held and being spun along two different edges of two different electrodes. For example, controller classifier 546 may output control signals causing actuator 544 to first position sensors 552 so as to have a field-of-view generally centered on the edge of electrode 534-1 as scattered light from the spinning particles 50-1 is sensed. Following the collection of scattered light measurements from the spinning part of 50-1, controller classifier 546 may output control signals causing actuator 544 to reposition sensors 552 to position sensors 552 so as to have a field-of-view generally centered on the edge of electrode 534-2 as scattered light from the spinning particle 50-2 is sensed. As described above, in some implementations, the positioning of sensors 552 may be based upon closed-loop feedback.

Controller classifier 546 controls the operation of system 520 and generates classification results for the particles 50 of interest. As schematically shown by FIG. 6A, controller classifier 546 comprises library/database 560, instructions 300 (described above) and processor 302 (described above). Library/database 560 comprises a library or lookup table of various values corresponding to already identified particles.

Library/database 560 may be formed using empirically determined data. For example, a particle having an already identified or known identity or classification type may be suspended in fluid 48 within volume 30 and rotated by an electric field formed by the application of an alternating current of a particular frequency to electrodes 534. The signals from the various photosensitive elements 556 may be recorded in the library 560 for the particular particle being rotated using the AC voltage of the particular frequency. Likewise, data derived from such signals from photosensitive members 556, such as the rotation rate or spin rate of the particular particle may also be stored as an entry with the associated AC frequency. This process may be repeated for multiple frequencies as well as for multiple different particles having already identified identities to establish the library. This library of empirically determined data serves as a reference for later identifying particles of unknown identity or unknown classification.

As shown in broken lines, in some implementation, the library/database 560 may be distinct and remote from controller classifier 546. For example, library/database 560 may reside in a separate database accessed by a distinct server, wherein controller classifier 546 retrieves information from the database 560 across a wired or wireless network. Such an implementation, library site database 560 may be shared amongst multiple systems 520.

Instructions 300 (described above) direct processor 302 to classify or identify the various particles 50 along edges of electrodes 534 based upon signals received for each of the particles from each of the sensors 552. In the example illustrated, instructions 300 direct the concurrent identification classification of multiple particles 50 spinning along a single or same edge of a single one of electrodes 534. Instructions 300 may direct processor 302 to carry out method 100, method 200 or other methods. As described above with respect to instructions 300, in other implementations, the functions of controller classifier 546 may be broken out amongst distinct controllers or processors. For example, a separate controller may control electrodes 534, focused light source 538 and sensor 542 and a separate classifier may generate and output identification or classification data for particles 50 based upon signals from sensor 542.

Input/output 550 comprises at least one device by which instructions or commands may be entered through controller classifier 546 and from which data and results from controller classifier 546 may be presented or otherwise output to a user. In one implementation, input/output 550 may include a non-transitory memory for storing the results. In one implementation, input/output 550 may comprise a display or monitor. In one implementation input/output 550 may comprise input devices such as a keyboard, touchpad, mouse or other input devices. In some implementations, input/output device 550 may comprise a touchscreen.

Figure 7:
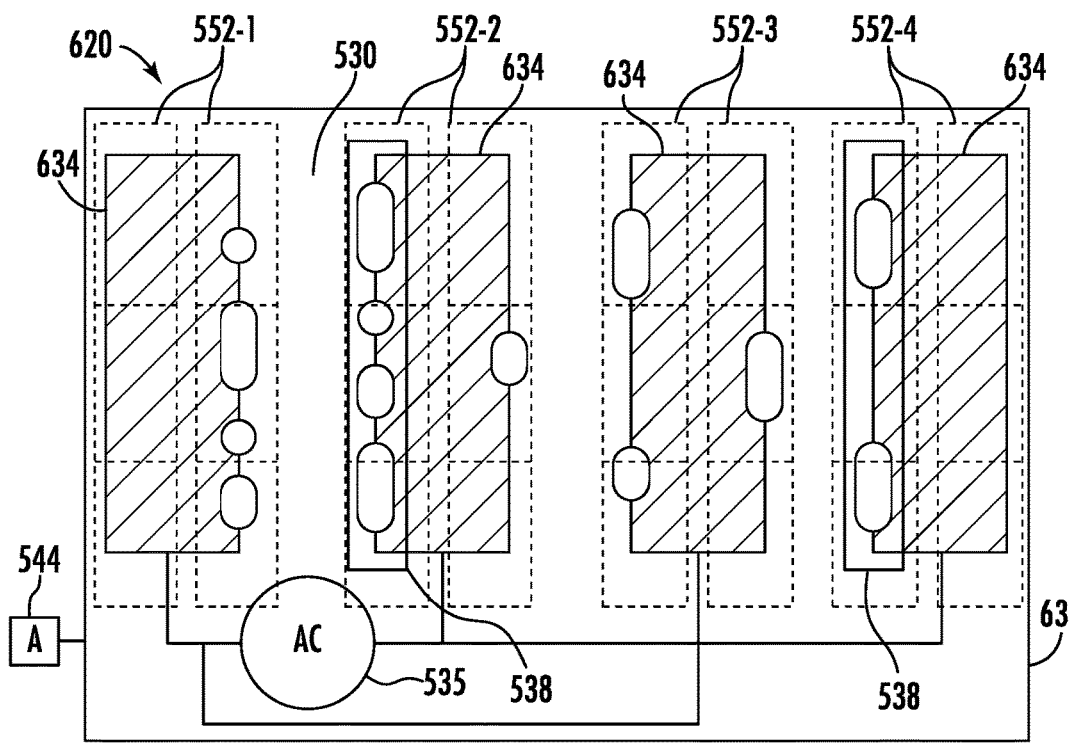
FIG. 7 is a top view illustrating portions of an example particle classifying system.

FIG. 7 is a top view illustrating portions of an example particle classifying system 620. Particle classifying system 620 is similar to particle classifying system 520 described above except that particle classifying system 620 comprises multiple pairs of electrodes 634 underlying volume 530. Electrodes 634 are similar to electrodes 534. Although not illustrated in FIG. 7, system 620 additionally comprises fluid/particle supply 524, sensors 552 situated along the edges of each of electrode 634, controller classifier 546 and input/output 550 (each of which is shown and described above with respect to system 520). In the example illustrated, electrodes 634 are supported by a movable transparent stage or platform 633, wherein actuator 544, under the control of controller classifier 546, repositions platform 633 to sequentially position different edges of different electrodes in the centered field-of-view of sensors 552 as described above with respect to system 520. In other implementations, the arcuate arrangement of the sensors 552 may alternate along electrode 634, wherein alternate arcuate arrangements of sensors 552 focus on different alternating edge portions of electrode 634.

Figure 8A:
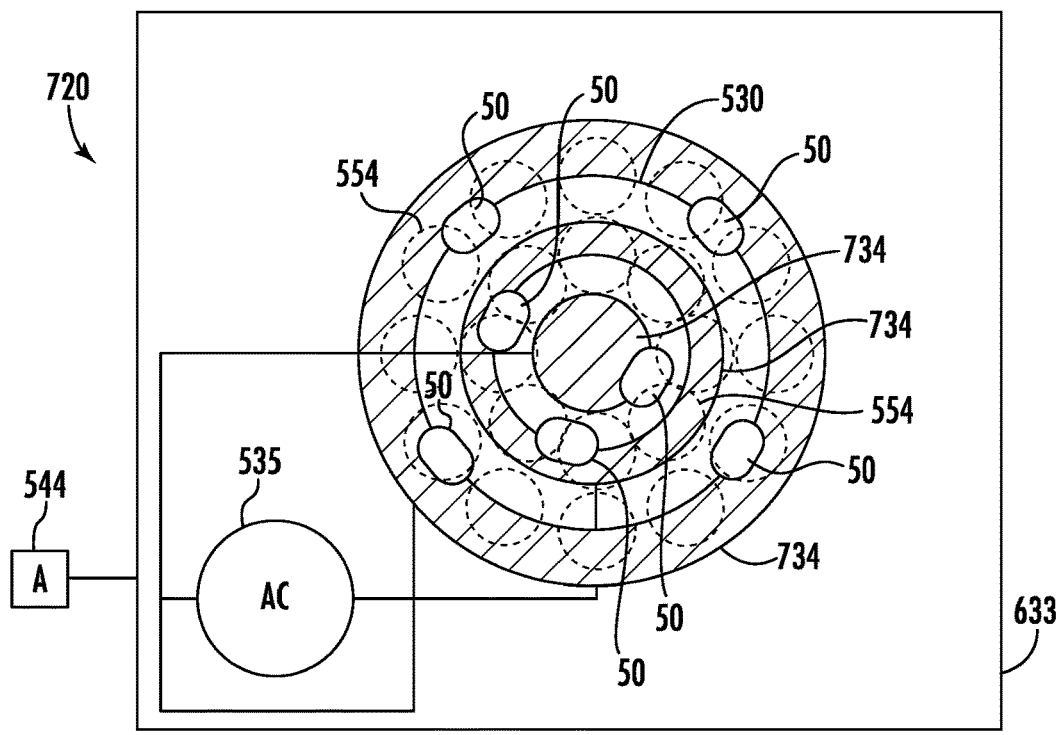
FIG. 8A is a top view illustrating portions of an example particle classifying system.
Figure 8B:
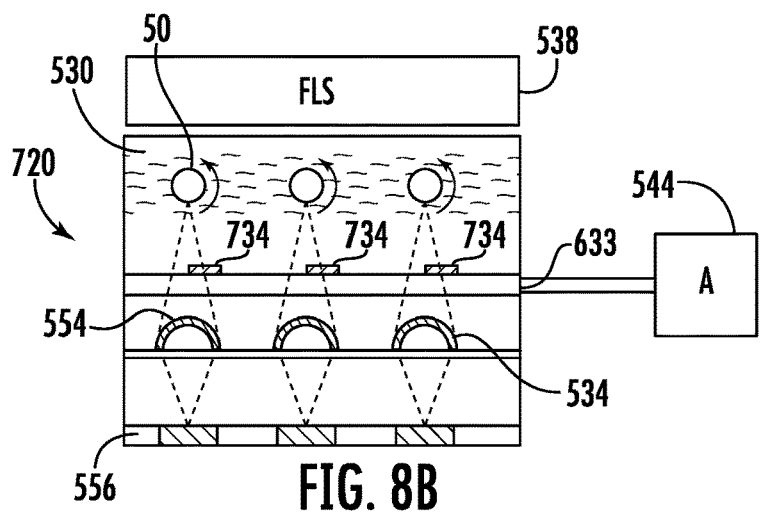
FIG. 8B is a sectional view of the example particle classifying system of FIG. 8A.

FIG. 8A is a top view of portions of an example particle classifying system 720. FIG. 8B is a sectional view of system 720, illustrating an example particle 50 being sensed while being spun by a nonrotating electric field produced by concentric ring electrodes. Particle classifying system 720 is similar to particle classifying system 520 described above except that particle classifying system 720 comprises multiple concentric rings of electrodes 734 underlying volume 530. Electrodes 734 are similar to electrodes 534. Although not illustrated in FIG. 8A, system 720 additionally comprises fluid/particle supply 524, sensors 552 situated along the edges of each of electrodes 734, controller classifier 546 and input/output 550 (each of which is shown and described above with respect to system 520). In the example illustrated, electrodes 734 are supported by a movable transparent stage or platform 633, wherein actuator 544, under the control of controller classifier 546, repositions platform 633 to sequentially position different edges of different electrodes in the centered field-of-view of sensors 552 as described above with respect to system 520.

As shown by FIG. 8B, focused light source 858 direct slide upon each of the particles 50 during the rotation such that light is scattered by such particles. The scattered light is received by optics 554, in the form of lenslets, arranged in a circular series having field-of-views coinciding with the internal edges of the electrode 734. The optics 554 focus the received scattered light onto distinct portions of photosensitive member 556 which outputs signals to controller classifier 546 (shown in FIG. 1) based upon the received photons.

Figure 9:
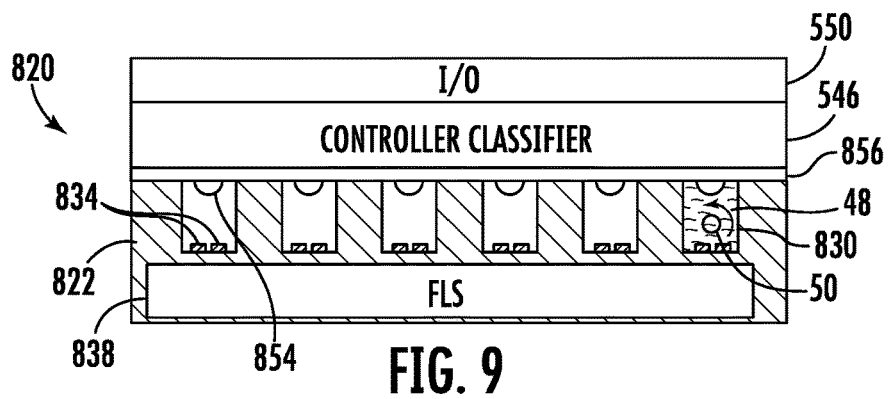
FIG. 9 is a sectional view illustrating portions of an example particle classifying system.

FIG. 9 is a sectional view illustrating portions of an example particle classifying system 820. Particle classifying system 820 comprises multi well plate 822, electrodes 834, focused light source relate 38, optical members 854, photosensitive member 856, controller classifier 546 and input/output 550. Components that correspond to components of any of the above described particle classifier systems are numbered similarly.

Multi well plate 822 comprises a plate, base or structure providing multiple individual and distinct wells 830. Each of wells 830 defines a volume to contain fluid potentially containing particles of interest. Each of wells 830 may be supplied with the fluid from fluid/particle supply, such as fluid/particle supply 524 described above. In one implementation, fluids of particle supply 524 may comprise a fluid dispensing member which selectively deposit droplets of fluid in each of the wells 830.

Electrodes 834 are similar to electrodes 534 described above. Electrodes 834 are formed along an interior surface of each of wells 830. Electrodes 834 are electrically connected to an AC power source, such as AC power source 535 described above, and are to be electrically charged so as to create a non-rotating electric field for rotating a particle 50 suspended within fluid 48 within the well 830. In the example illustrated, electrodes 834 may be formed from a transparent electrically conductive material, such as indium tin oxide, facilitating the transmission of light from focused light source 830 through such electrodes 834.

Focused light source 838 directs or focuses light into each of wells 830. In the example illustrated, focused light source 838 is formed below or as part of plate 822, wherein focused light source 838 transmits light through portions of the structure about each of wells 830 and into the interior of each of wells 830. In the example illustrated, focused light source 830 directs light through a transparent floor portion of each of wells 830 (and through electrodes 834) into wells 830, wherein the light impinges and is scattered from the particle 50 being rotated.

Optics 854 are located within respective wells 830 and transmit light that is scattered from the rotating particles 50 to photosensitive member 856. Photosensitive member 856 extends above each of optics 854. The photosensitive member 856 may be substantially similar to the photosensitive members 556 as described above. The photosensitive member 856 transmits signals to controller classifier 546 (described above), wherein controller classifier 546 classifies the individual particles in the individual wells 830 as described above. For example, controller classifier 546 may classify or identify the particles in accordance with method 100 or method 200 as described above.

Figure 10:
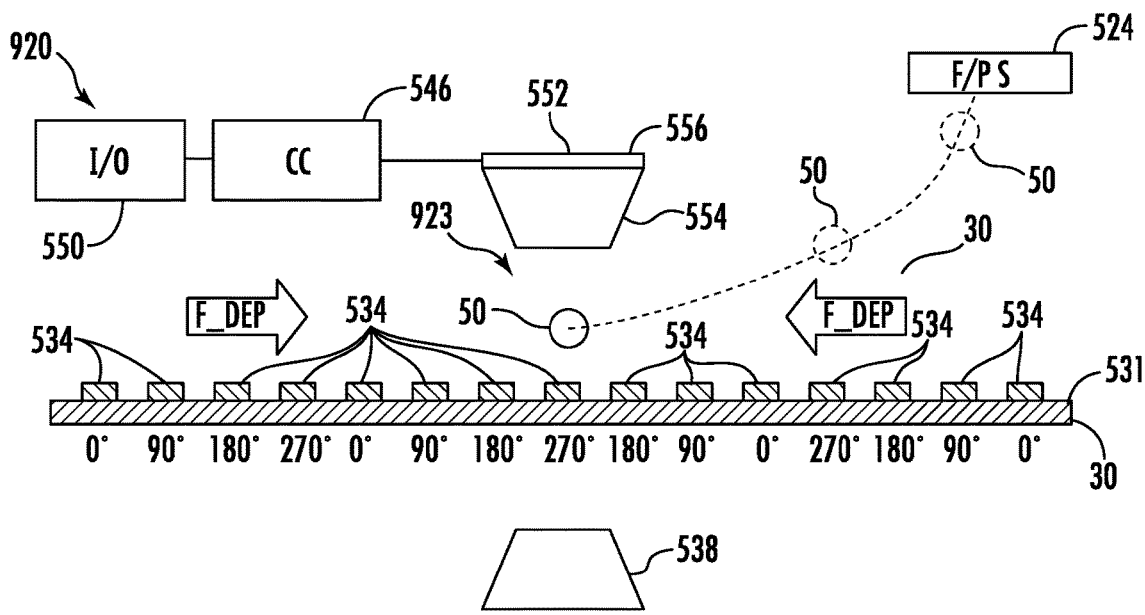
FIG. 10 is a side view illustrating portions of an example particle classifying system.

FIG. 10 is a side view schematically illustrate portions of an example particle classifying system 920. Particle classifying system 920 is similar to particle classifying system 520 described above except that system 920 additionally utilizes a series of electrodes formed on floor 531 to move particles to distinct target sensing location or locations with respect to distinct sets of angularly arranged scattered light sensors 552. Those components of system 920 which correspond to components of system 520 are numbered similarly.

In the example illustrated, electrodes form electric fields that are controlled so as to move the particles or bacteria, using dielectrophoresis, to a smaller sensing region having the particle rotating electrodes and the scattered light sensor or sensors. In the example illustrated, a controller is provided to control the supply of AC voltage sources to the electrodes so as to produce a traveling wave dielectrophoresis force from multiple directions to move the particle to a target sensing location. In the example illustrated, the controller may be provided to control the supply of AC voltage the electrodes such that the timing of the electrical field is synchronized with a dispenser of the particles. As a result, system 920 facilitates more portable and compact systems and devices for classifying particles or bacteria.

In the example illustrated, controller 546 controls the supply of AC voltage to the electrodes 534 to produce a traveling wave dielectrophoresis force from multiple directions to move the particle 50 to the target sensing region 546. In one implementation in which electrodes 534 comprise concentric rings (similar to that shown in FIG. 8), the particle may be pushed to a desired radial position in the ring with respect to a set of scattered light sensors 552 (one of which is shown).

In one implementation, controller 546 controls the supply of AC voltage to the electrodes 534 such that the timing of electrical field is synchronized with the dispensing of particles by fluid/particle supply 524. For example, in one implementation, in the beginning when a particle is just expected enter the liquid in the well or volume 30, and is farthest from electrodes, the voltage applied electrodes may be high such of the particle, even though far from electrodes, experiences sufficient force to be pulled in. As a particle moves closer to the floor 531, the magnitude of the voltage may be decreased by controller 546 as the particle may be moved with less voltage while experiencing the same degree of force. By controlling the electric field based upon its expected proximity to the target sensing region, the likelihood of the particle experiencing a sufficiently high electrical field so as to lyse (approximately greater than 1 V per micrometer) is reduced.

In one implementation, each neighboring electrode may be set 180° out of phase during a pull down period (when the particles pulled down towards the floor 831 with electrodes 534). During the pull down period, the field may be decreased. After the pull down, a centering period may begin where the neighboring electrodes are set 90° out of phase such as a traveling wave dielectrophoresis force is created which pushes the particle laterally to a centering position with respect to scattered light sensors 554. Once in the centering position, the electrodes may be electrically charged to form a non-rotating electric field to spin and hold the particles in place as a scattered light from such particles is sensed.

In the example illustrated, controller classifier 546 may control the supply of AC voltage source to the electrodes such that (1) a first electrical field pulls a particle towards the electrodes, (2) after pulldown, a second electrical field moves a particle to a sensing region and (3) a third electrical field rotates of particles at the sensing position or rotation of the particle sense for classification of the particle. Once the particle 50 is removed to the selected target sensing region, controller classifier 546 may output signals causing electrodes 534 of the target sensing region 923 to rotate the particle 50 and classify the particle 50. As described above, controller classifier 546 may identify or classify the particle in the particular sensing region pursuant to method 100 or method 200 as described above.

Figure 11:
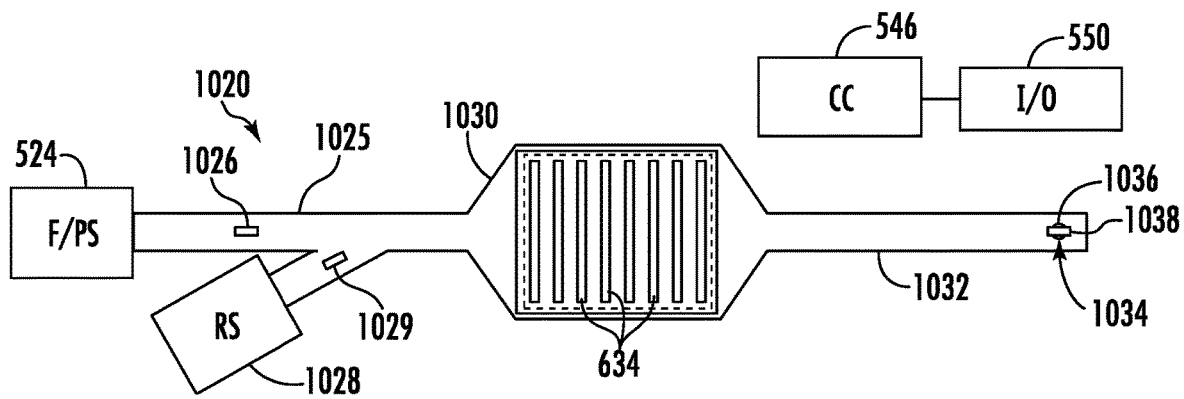
FIG. 11 is a top view illustrating portions of an example particle classifying system.

FIG. 11 is a top view illustrating portions of an example particle classifying system 1020. Particle classifying system 1020 is part of a microfluidic circuit formed on a microfluidic chip. Particle classifying system 1020 comprises fluid/particle supply 524, fluid supply passage 1025, fluid pump 1026, reagent supply 1028, reagent pump 1029, sensing volume 1030, electrodes 634, focused light source 538 (shown in FIG. 6A), scattered light detectors 552 (shown in FIG. 6A), discharge passage 1032, fluid ejector 1034, controller classifier 546 and input/output 550. Fluid/particle supply 524 supplies fluid potentially containing particles of interest to fluid supply passage 1025 which directs the fluid to fluid sensing volume 1030.

Reagent supply 1028 comprises a supply of reagent for being selectively supplied to fluid supply passage 1025 and sensing region 1030. Reagent supply 1028 may supply an antibiotic or a selected group of antibiotics to the fluid containing the particles of interest such as in circumstances where the particles of interest comprise a bacterium or multiple types of bacteria. The reagent supplied may comprise other reagents such as cell stains, such as hexamethyl pararosaniline chloride (gramm stain), which may alter the particle's or cell's scattering or spinning behavior. In some implementations, reagent supply 1028 and reagent pump 1029 may be omitted.

Pumps 1026 and 1029 move or displace fluid towards fluid sensing volume 1030. Pump 106 moves fluid along passage 1025 from supply 524 to volume 1030. Pump 1029 moves fluid from supply 1028 into passage 1025 and/or into volume 1030. Pumps 1026 and 1029 may comprise inertial pumps which comprise a fluid actuator to displace fluid. In one implementation, the fluid actuator comprises a thermal resistor formed upon a floor of the passage which, upon receiving electrical current, heats to a temperature above the nucleation temperature of the solution so as to vaporize a portion of the adjacent solution or fluid to create a bubble which displaces fluid along the fluid passage. In other implementations, the fluid actuators forming the inertial pumps may comprise other forms of fluid actuators. In other implementations, the fluid actuators may comprise fluid actuators in the form of a piezo-membrane based actuator, and electrostatic membrane actuator, mechanical/impact driven membrane actuator, a magnetostrictive drive actuator, and electrochemical actuator, and external laser actuators (that form a bubble through boiling with a laser beam), other such microdevices, or any combination thereof.

Fluid sensing volume 1030 is similar to volumes 30 and 530 described above. Fluid sensing volume 1030 contains the fluid and suspended particle or particles that are being rotated. In the example illustrated, fluid sensing volume 1030 extends adjacent to multiple electrodes in the form of multiple parallel electrode lines (similar to the electrode configuration shown and described above with respect to FIG. 7). Each of electrodes 634 is connected to a source of AC voltage which is under the control of controller classifier 546. Each of such electrodes 634 as well as the floor of volume 1030 may be transparent to allow a focused light source 538 or multiple light sources 538 to direct light onto the particle or particles being rotated by a nonrotating electric field produced by electrodes 634. Scattered light sensors 552 (described above with respect to FIG. 6A) may be centered upon the edges of the electrode 634 to receive light emitted by the focused light sensor that is scattered from the rotating particles. As described above, each of such scattered light sensors 552 may comprise optics that direct the scattered light onto a photosensitive member which outputs signals to controller classifier 546. Controller classifier 546 (described above) may carry out identification and classification pursuant to method 100 or method 200. Controller classifier 546 may store and/or display the classification results on input/output 550.

Following classification of particles within a particular sample or volume of fluid containing particles, controller classifier 546 may further output control signals actuating fluid ejector 1034 to eject fluid within discharge passage 1032 and to further draw the existing fluid from fluid sensing volume 1030 for discharge. In one implementation, fluid ejector 1034 may comprise a nozzle orifice 1036 and a corresponding fluid actuator 1038 which displaces fluid through the nozzle orifice 1036. The fluid actuator 1038 may be similar to the fluid actuator described above and employed as part of the inertial pump 1026 or 1029.

Figure 12:
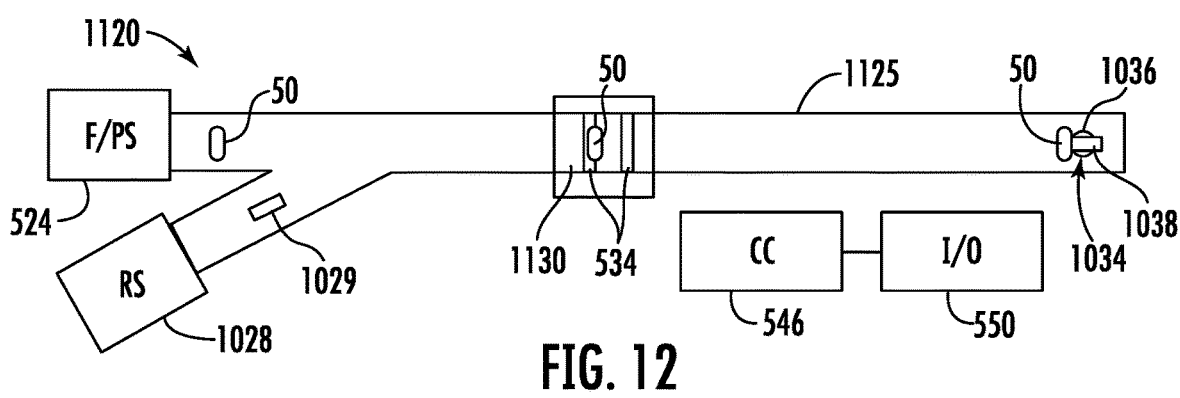
FIG. 12 is a top view illustrating portions of an example particle classifying system.

FIG. 12 is a top view schematically illustrating portions of an example particle classifying system 1120. Particle classifying system 1120 is similar to particle classifying system 1020 described above except that particle classifying system 1120 is sized or dimensioned so as to serially move individual particles 50, in a single file arrangement, along a single fluid passage 1125 having a fluid sensing volume 1130 adjacent to a pair of electrodes 534. Those remaining components of system 1120 which correspond to the above-described classifying systems are numbered similarly.

In the example illustrated, fluid sensing volume 1130 extends adjacent to multiple electrodes in the form of multiple parallel electrode lines (similar to the electrode configuration shown and described above with respect to FIG. 7). Each of electrode 634 is connected to a source of AC voltage which is under the control of controller classifier 546. Each of such electrodes 634 as well as the floor of volume 1130 may be transparent to allow a focused light source 538 or multiple light sources 538 to direct light onto the particle or particles being rotated by a nonrotating electric field produced by electrode 634. Scattered light sensors 552 (described above with respect to FIG. 6A) may be centered upon the edges of the electrode 634 to receive light emitted by the focused light sensor that is scattered from the rotating particles. As described above, each of such scattered light sensors 552 may comprise optics that direct the scattered light onto a photosensitive member which outputs signals to controller classifier 546. Controller classifier 546 (described above) may carry out identification and classification pursuant to method 100 or method 200. Controller classifier 546 may store and/or display the classification results on input/output 550.

Following classification of particles within a particular sample or volume of fluid containing particles, controller classifier 546 may further output control signals actuating fluid ejector 1034 to eject fluid within discharge passage 1032 and to further draw the existing fluid from fluid sensing volume 1130 for discharge. In one implementation, fluid ejector 1034 may comprise a nozzle orifice 1036 and a corresponding fluid actuator 1038 which displaces fluid through the nozzle orifice 1036. The fluid actuator 1038 may be similar to the fluid actuator described above and employed as part of the inertial pump 1026 or 1029.

Figure 13:
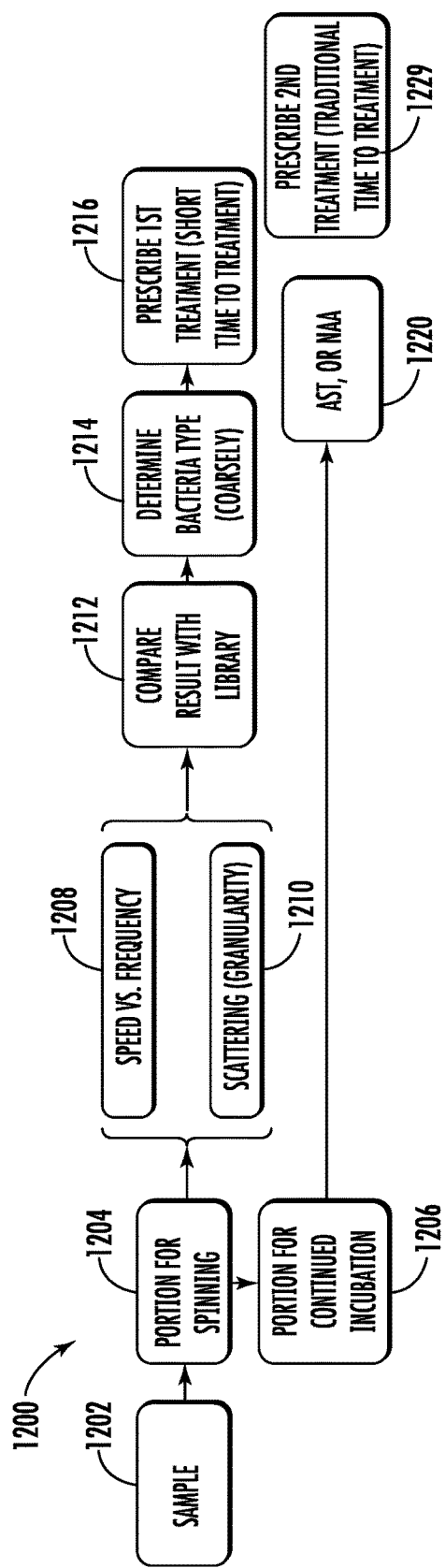
FIG. 13 is a flow diagram of an example bacteria diagnosis and treatment method.

FIG. 13 is a flow diagram of an example bacteria diagnosis and treatment method 1200. Method 1200 is suited for identifying bacteria associated with sepsis or bacteremia. Method 1200 may be carried out by any of the above described particle classifying systems and structures described above.

As indicated by block 1202, a sample, such as a blood sample, is provided, wherein a first portion of the sample is taken for spinning/bacteria classification per block 1204 and a second portion of the sample is separated out and taken for continued incubation as indicated by block 1206. As indicated by block 1208, the portion removed for spinning per block 1204 is rotated with an electrical field, such as a non-rotating electrical field, during which scattered light from the rotating or spinning particles is sensed and detected at each of a plurality of different frequencies of AC power applied to the electrodes.

In one implementation, an electrical field is utilized to pull the bacteria cells towards a position of the electrode edges via dielectrophoresis. An AC field is applied between adjacent electrodes so as to attract the cells to the electrodes and spin the cells. During such spinning, a plurality of scattered detectors or scattered light sensors may observe the cells. As the cells rotate, periodic scattering signals from the scattered light sensors is recorded. From the period of the signal, a rotation rate of the cells may be determined. Controller 546, or another controller, may then proceed to sweep frequencies of the AC power to obtain a rotation rate or "speed" as a function of frequency.

As indicated by block 1210, additional information may also be gathered during the spinning of the bacteria cells. For example, the scattering intensity of the light may also be detected and used as part of the signature identifying the bacteria cell of interest.

As indicated by block 1212, the results from at least block 1208 (and possibly additionally block 1210) are compared to entries in a library, such as library 560 described above. As indicated by block 1214, based upon such comparison, a classification or bacteria type may be coarsely determined. Using this coarse determination of the bacteria type, a treatment may be prescribed as indicated by block 1216. Due to the fast response time, the prescribed first treatment may occur in a timely fashion, enhancing the patient's chance of survival.

As indicated by block 1220, in parallel with the course bacteria type determination carried out in blocks 1204-1216, the portion set aside for incubation block 1206 may be further analyzed using other more lengthy bacteria identification methods such as anti-microbial susceptibility testing or nucleic acid amplification (NAA) testing. As indicated by block 1224, a second subsequent treatment may be prescribed based upon the identification of the bacteria resulting from block 1220.

Figure 14:
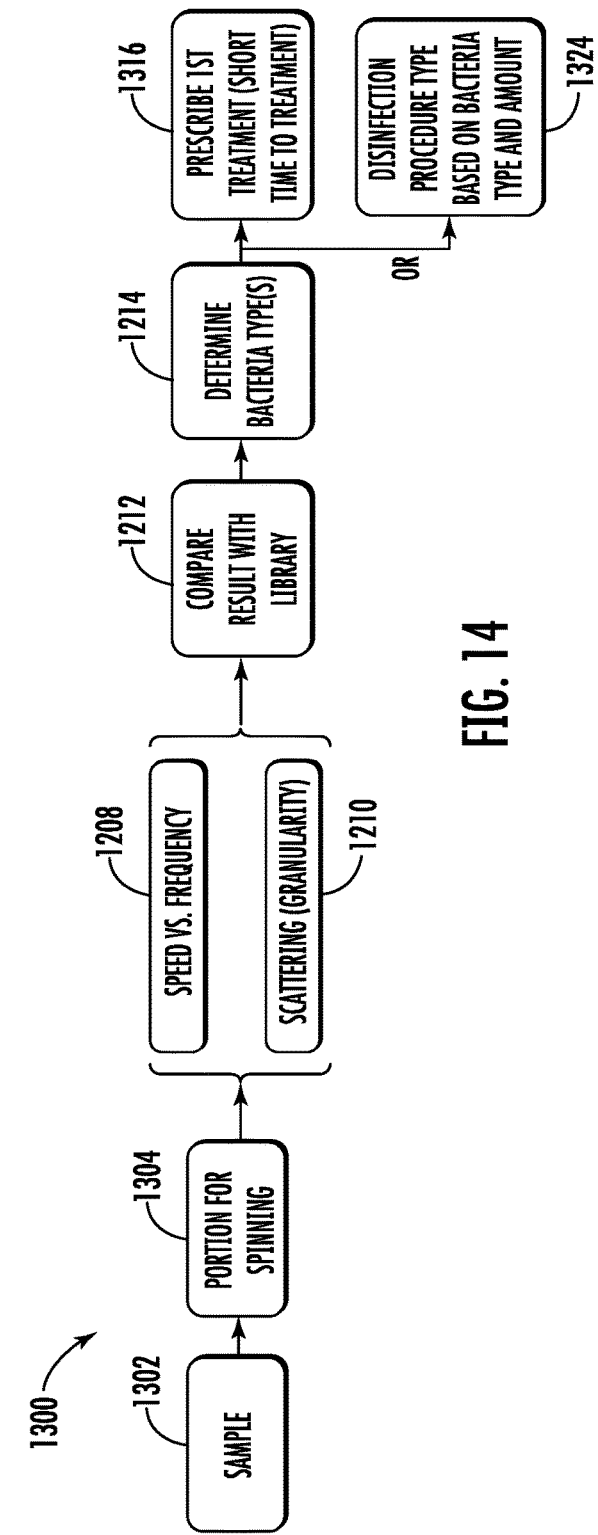
FIG. 14 is a flow diagram of an example bacteria identification and remedial method.

FIG. 14 is a flow diagram illustrating an example bacteria identification and remedial method 1300. Method 1300 is suited for identifying bacteria and facilitating remedial measures in work environments such as food processing plants. Method 1300 may be carried out by any of the above described particle classifying systems and structures described above. Those steps described above with respect to method 1200 which correspond to steps with respect to method 1300 a numbered similarly.

As indicated by block 1302, a sample from a work environment, such as a food processing plant, is taken. As indicated by block 1304, a portion of the sample is taken for spinning. The process then proceeds according to block 1208, 1210, 1212 and 1214 as described above. As indicated by block 1316 and 1324, using the identification or classification of the bacteria found in block 1214, the facility, such as a food processing plant, may be shut down for disinfection (block 1316) or a particular disinfection procedure type may be selected based upon the identification of the bacteria as well as the extent or amount of bacteria found (block 1324).

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A particle classification system comprising:
   a volume to contain a fluid having a suspended particle;
   electrodes proximate the volume to apply an electric field to rotate the suspended particle;
   a focused light source;
   a scattered light sensor to sense light from the focused light source that has scattered upon impinging the rotating suspended particle; and
   a classifier to classify the particle based at least in part upon signals from the scattered light sensor.

2. The system of claim 1, wherein the sensor comprises light scattering receptors arranged about an edge of the electrodes.

3. The system of claim 1, wherein the electrodes comprise a pair of electrode lines to apply a nonrotating electric field to the particle to rotate the particle, the system further comprising a second scattered light sensor, wherein the scattered light sensor and the second scattered light sensor are spaced along the pair of electrode lines to concurrently sense light being scattered by two different particles being concurrently rotated by the pair of electrode lines.

4. The system of claim 1 further comprising a stage supporting the electrodes, wherein at least one of the stage and the scattered light sensor are linearly movable relative the other.

5. The system of claim 4 further comprising an actuator to linearly move the stage and the scattered light sensor relative to one another based upon signals from the scattered light sensor.

6. The system of claim 1, wherein the electrodes comprise a pair of electrode lines and wherein the system further comprises a second scattered light sensor, the scattered light sensor and the second scattered light sensor being spaced to sense different particles being concurrently rotated by the pair of electrode lines.

7. The system of claim 1 further comprising a controller, wherein the controller is to control the supply of AC voltage sources to the electrodes so as to produce a traveling wave dielectrophoresis force from multiple directions to move the particle to a target sensing location.

8. The system of claim 1 further comprising a controller, wherein the controller is to control the supply of AC voltage to the electrodes such that timing of the electrical field is synchronized with a dispenser of particles.

9. The system of claim 1 further comprising a controller, wherein the controller is to the supply of AC voltage source to the electrodes such that (1) a first electrical field pulls the particle towards the electrodes, (2), after pulldown, a second electric field moves the particle to a sensing position, and (3) a third electric field rotates the particle at the sensing position while rotation of the particle is sensed for classification of the particle.

10. The system of claim 1, wherein the volume and the electrodes are within a sensing region, the system further comprising:

an inertial pump to selectively move the fluid with the particle across the sensing region; and
a fluid ejector to selectively eject the fluid containing the suspended particle following the particle being sensed.

11. The system of claim 10 further comprising a reagent introducer to introduce reagent into the fluid containing the suspended particle.

12. The system of claim 1, wherein the electrodes are to apply a non-rotating electric field to the suspended particle to rotate the suspended particle.

13. A particle classifying method comprising:
applying an electric field to induce rotation of a particle suspended within a fluid;
sensing scattered light that has scattered upon impinging the particle during the rotation; and
classifying the particle based upon the scattered light.

14. The particle classifying method of claim 13, wherein the electric field applied to the particle has a first frequency and wherein the method further comprises:
applying a second electric field having a second frequency to induce a second rotation of the particle;
sensing scattered light that is scattered upon impinging the particle during the second rotation, wherein the classifying of the particle is based upon the rotation of the particle and the second rotation of the particle as indicated by the sensing of the scattered light.

15. A non-transitory computer-readable medium containing instructions to direct a processor to:
output control signals to an alternating current power source to apply an electric field to a particle suspended in a fluid;
receiving signals from a scattered light sensor indicating rotation of the particle in response to the applied non-rotating electric field; and
classify the particle based upon the indicated rotation of the particle.

* * * * *